United States Patent
VanBlon et al.

(10) Patent No.: US 10,397,358 B2
(45) Date of Patent: Aug. 27, 2019

(54) APPARATUS, METHOD, AND PROGRAM PRODUCT FOR PRE-CACHING STREAMING CONTENT

(71) Applicant: LENOVO (Singapore) PTE. LTD., New Tech Park (SG)

(72) Inventors: Russell Speight VanBlon, Raleigh, NC (US); Scott Wentao Li, Cary, NC (US); Joaquin F. Luna, Durham, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 593 days.

(21) Appl. No.: 15/052,500

(22) Filed: Feb. 24, 2016

(65) Prior Publication Data

US 2017/0244802 A1    Aug. 24, 2017

(51) Int. Cl.
*H04L 29/08* (2006.01)
*H04L 29/06* (2006.01)

(52) U.S. Cl.
CPC .......... *H04L 67/2842* (2013.01); *H04L 65/60* (2013.01)

(58) Field of Classification Search
None
See application file for complete search history.

(56) References Cited

U.S. PATENT DOCUMENTS

| | | | | |
|---|---|---|---|---|
| 2007/0112973 A1* | 5/2007 | Harris | .............. | H04L 29/06027 709/232 |
| 2014/0006538 A1* | 1/2014 | Oikonomou | ........ | H04L 67/2847 709/213 |
| 2015/0142880 A1* | 5/2015 | Arai | .......................... | G06F 8/65 709/203 |
| 2015/0378670 A1* | 12/2015 | Reilly | .................... | G06F 3/165 700/94 |
| 2016/0191985 A1* | 6/2016 | Tirpak | .............. | H04N 21/4331 725/46 |
| 2017/0171273 A1* | 6/2017 | VanBlon | .............. | H04W 4/029 |

* cited by examiner

*Primary Examiner* — Philip J Chea
*Assistant Examiner* — Hassan A Khan
(74) *Attorney, Agent, or Firm* — Kunzler Bean & Adamson

(57) ABSTRACT

Apparatuses, methods, and program products are disclosed for pre-caching streaming content. One apparatus includes a processor, and a memory that stores code executable by the processor. The code is executable by the processor to determine to perform pre-caching of streaming content. The code is also executable by the processor to determine a streaming content to pre-cache. The code is executable by the processor to pre-cache the streaming content.

12 Claims, 6 Drawing Sheets

APPARATUS, METHOD, AND PROGRAM PRODUCT FOR PRE-CACHING STREAMING CONTENT

FIELD

The subject matter disclosed herein relates to streaming content and more particularly relates to pre-caching streaming content.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for streaming content. Delays may exist when switching between different streaming content.

BRIEF SUMMARY

An apparatus for pre-caching streaming content is disclosed. A method and computer program product also perform the functions of the apparatus. In one embodiment, the apparatus includes a processor, and a memory that stores code executable by the processor. The code, in various embodiments, is executable by the processor to determine to perform pre-caching of streaming content. In a further embodiment, the code is executable by the processor to determine a streaming content to pre-cache. The code, in some embodiments, is executable by the processor to pre-cache the streaming content.

In some embodiments, the code executable by the processor to determine to perform pre-caching of streaming content further includes code executable by the processor to detect input from a sensor. In one embodiment, the code executable by the processor to determine to detect input from the sensor further includes code executable by the processor to detect input indicating a predicted change to a currently streaming content.

In another embodiment, the code executable by the processor to determine to perform pre-caching of streaming content further includes code executable by the processor to detect that an end portion of a currently streaming content is reached. In some embodiments, the code executable by the processor to determine the streaming content to pre-cache further includes code executable by the processor to predict the streaming content based on a viewing history.

In certain embodiments, the code executable by the processor to determine the streaming content to pre-cache further includes code executable by the processor to predict the streaming content based on a viewing pattern. In one embodiment, the code executable by the processor to pre-cache the streaming content further includes code executable by the processor to pre-cache a predetermined period of time of the streaming content. Moreover, in various embodiments, the code executable by the processor to pre-cache the streaming content further includes code executable by the processor to pre-cache a smaller amount of data than available.

A method for pre-caching streaming content, in one embodiment, includes determining, by use of a processor, to perform pre-caching of streaming content. In some embodiments, the method includes determining a streaming content to pre-cache. In a further embodiment, the method includes pre-caching the streaming content.

In some embodiments, determining to perform pre-caching of streaming content includes detecting input from a sensor. In various embodiments, detecting input from the sensor includes detecting input from a device selected from the group consisting of an accelerometer, a gyroscope, a camera, a proximity sensor, a button, a touch-sensitive sensor, an audio sensor, and a motion sensor. In one embodiment, detecting input from the sensor includes detecting input indicating a predicted change to a currently streaming content.

In some embodiments, determining to perform pre-caching of streaming content includes detecting that an end portion of a currently streaming content is reached. In certain embodiments, determining the streaming content to pre-cache includes predicting the streaming content based on a viewing history. In various embodiments, determining the streaming content to pre-cache includes predicting the streaming content based on a viewing pattern. In one embodiment, determining the streaming content to pre-cache includes determining multiple streaming contents to pre-cache and pre-caching the streaming content includes pre-caching each streaming content of the multiple streaming contents. In some embodiments, pre-caching the streaming content includes pre-caching a predetermined period of time of the streaming content. In various embodiments, pre-caching the streaming content includes pre-caching a smaller amount of data than available.

In one embodiment, a program product includes a computer readable storage medium that stores code executable by a processor. The executable code, in certain embodiments, includes code to perform determining to perform pre-caching of streaming content. In a further embodiment, the executable code includes code to perform determining a streaming content to pre-cache. The executable code, in some embodiments, includes code to perform pre-caching the streaming content.

In certain embodiments, the code to perform determining the streaming content to pre-cache further includes code to perform determining multiple streaming contents to pre-cache, and the code to perform pre-caching the streaming content further includes code to perform pre-caching each streaming content of the multiple streaming contents.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
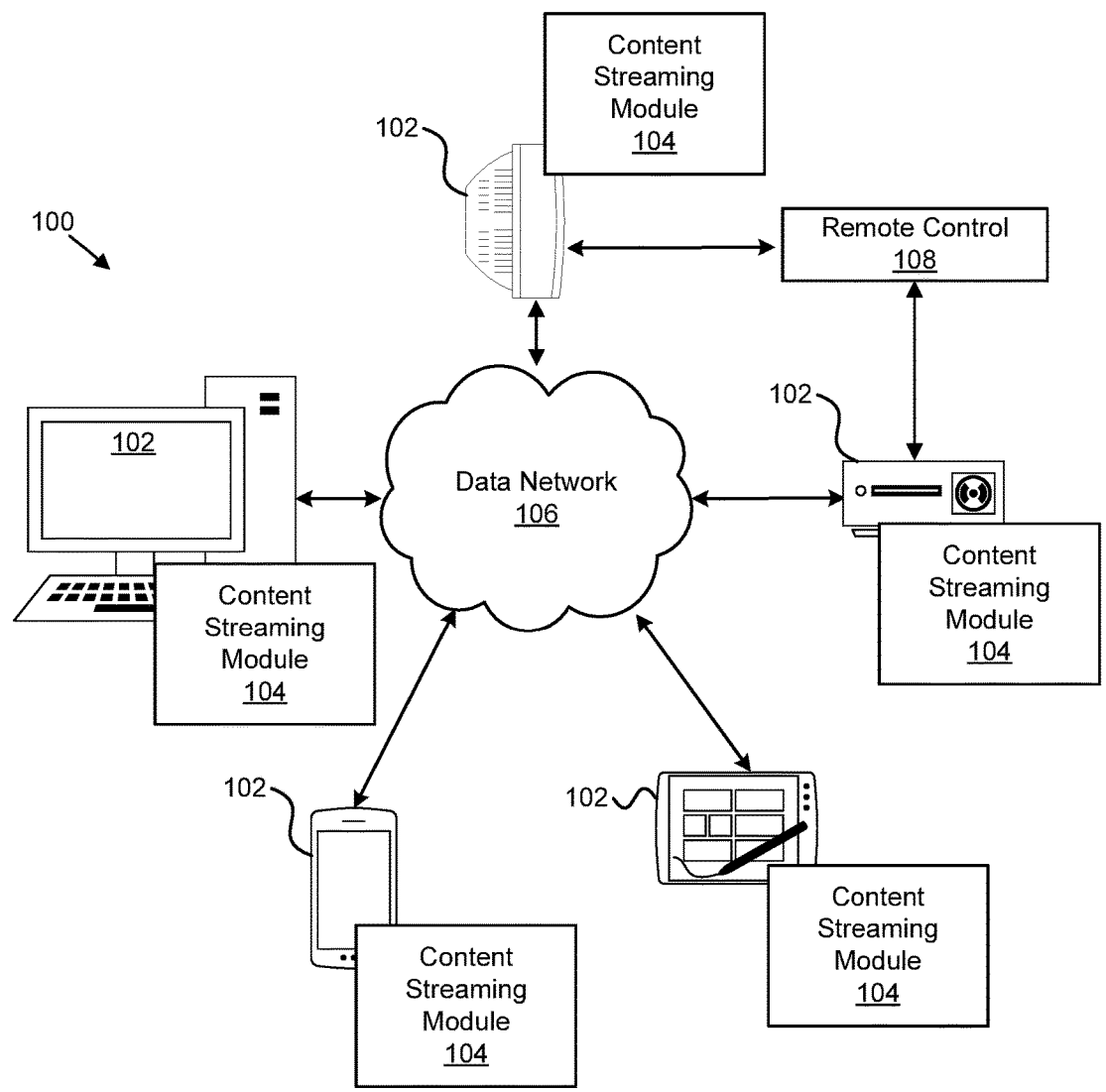
FIG. 1 is a schematic block diagram illustrating one embodiment of a system for pre-caching streaming content.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for pre-caching streaming content. In one embodiment, the system 100 includes information handling devices 102, content streaming modules 104, data networks 106, and remote controls 108. Even though a specific number of information handling devices 102, content streaming modules 104, data networks 106, and remote controls 108 are depicted in FIG. 1, one of skill in the art will recognize that any number of information handling devices 102, content streaming modules 104, data networks 106, and remote controls 108 may be included in the system 100.

In one embodiment, the information handling devices 102 include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), streaming devices, or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the content streaming module 104. In certain embodiments, the content streaming module 104 may determine to perform pre-caching of streaming content. The content streaming module 104 may determine a streaming content to pre-cache. The content streaming module 104 may also pre-cache the streaming content. In this manner, the content streaming module 104 may be used to pre-cache streaming content to reduce a zap time. As may be appreciated, a zap time may be a duration of time from which a viewer changes a streaming content (e.g., channel, streaming audio and video, etc.), such as by using the remote control 108, to the point that the new streaming content is displayed.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

In one embodiment, the remote control 108 may be used to communicate information to the information handling device 102 (e.g., television, smart television, streaming device, etc.). For example, the remote control 108 may be used to change from one streaming content to another streaming content. Moreover, in certain embodiments, the remote control 108 may be used to change a channel, change a volume, and so forth.

Figure 2:
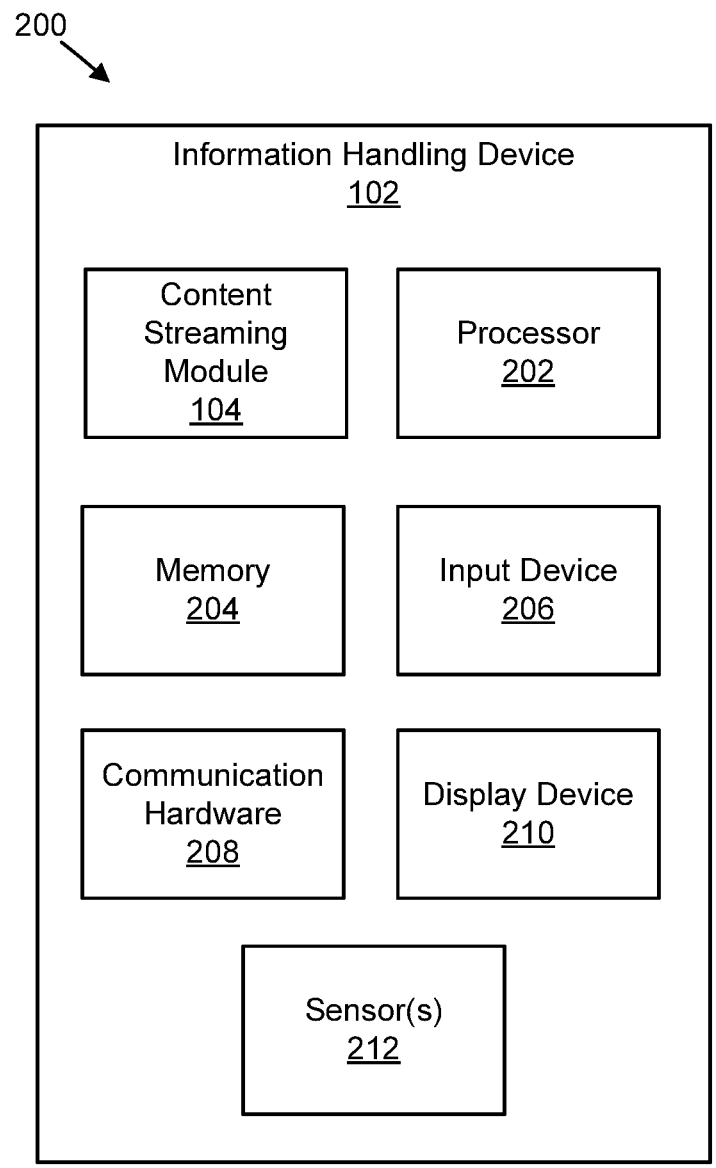
FIG. 2 is a schematic block diagram illustrating one embodiment of an apparatus including an information handling device.

FIG. 2 depicts one embodiment of an apparatus 200 that may be used for pre-caching streaming content. The apparatus 200 includes one embodiment of the information handling device 102. Furthermore, the information handling device 102 may include the content streaming module 104, a processor 202, a memory 204, an input device 206, communication hardware 208, a display device 210, and sensor(s) 212. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the content streaming module 104, the input device 206, the communication hardware 208, the display device 210, and the sensor(s) 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to content streaming. In some embodiments, the memory 204 also stores program code and related data, such as an operating system or other controller algorithms operating on the information handling device 102.

The information handling device 102 may use the content streaming module 104 for pre-caching streaming content. As may be appreciated, the content streaming module 104 may include computer hardware, computer software, or a combination of both computer hardware and computer software. For example, the content streaming module 104 may include circuitry, or a processor, used to determine to perform pre-caching of streaming content. As another example, the content streaming module 104 may include computer program code that determines a streaming content to pre-cache.

The input device 206, in one embodiment, may include any known computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime) upon a change in streaming content. In some embodiments, the display device 210 includes one or more haptic devices for producing vibrations, motion, or other haptic feedback. For example, the display device 210 may produce haptic feedback upon changing streaming content.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the content streaming module 104.

The sensor(s) 212 may include any suitable sensor for sensing user movement, a change in position of the remote control 108, a gaze direction, an image, a change in acceleration, a distance, an input, and so forth. For example, the sensor(s) 212 may include one or more of an accelerometer, a gyroscope, a camera, a proximity sensor, a button, a touch-sensitive sensor, an audio sensor, and a motion sensor. As explained in greater detail below, the sensor(s) 212 may be used to facilitate determining to perform pre-caching of streaming content and/or determining a streaming content to pre-cache.

Figure 3:
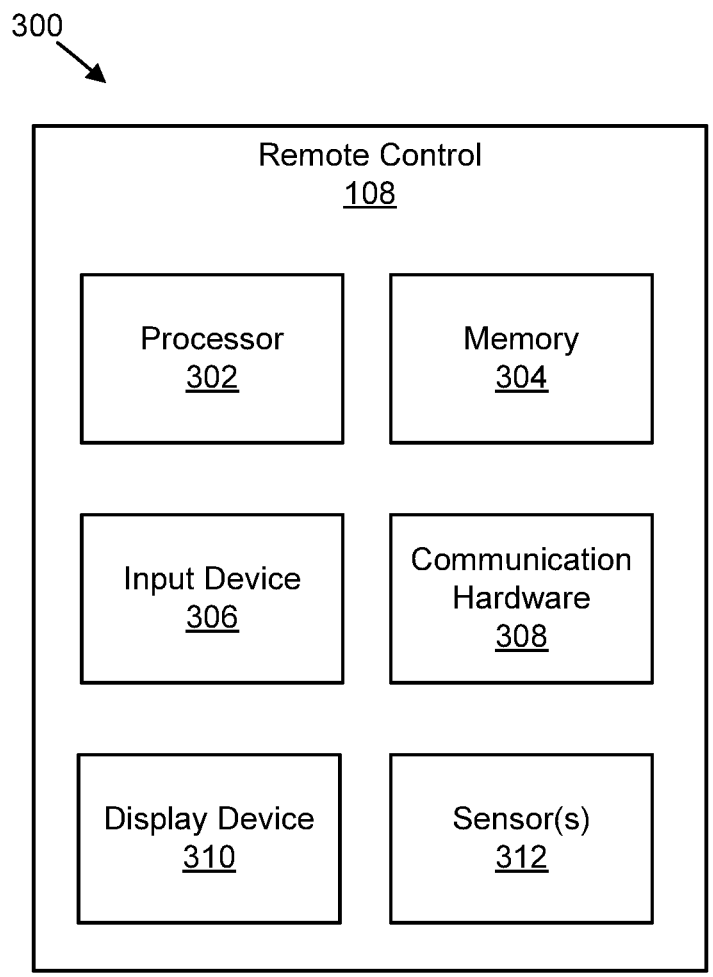
FIG. 3 is a schematic block diagram illustrating one embodiment of an apparatus including a remote control.

FIG. 3 depicts one embodiment of an apparatus 300 that may be used to facilitate predicting when to pre-cache streaming content. The apparatus 300 includes one embodiment of the remote control 108. Furthermore, the remote control 108 may include a processor 302, a memory 304, an input device 306, communication hardware 308, a display device 310, and sensor(s) 312, that may be substantially similar to the processor 202, the memory 204, the input device 206, the communication hardware 208, the display device 210, and the sensor(s) 212 described in relation to FIG. 2.

Figure 4:
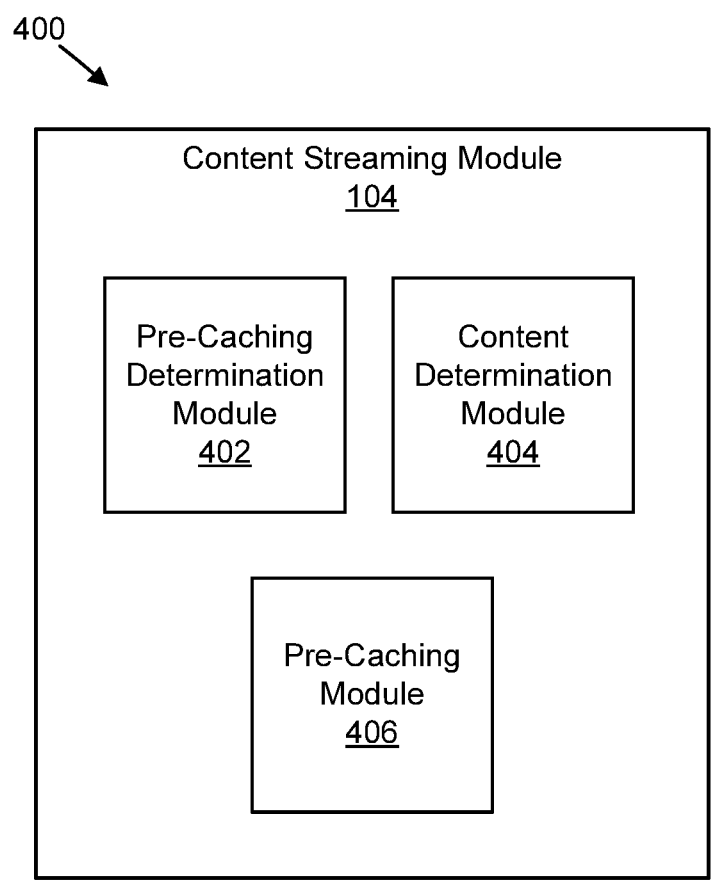
FIG. 4 is a schematic block diagram illustrating one embodiment of an apparatus including a content streaming module.

FIG. 4 depicts a schematic block diagram illustrating one embodiment of an apparatus 400 that includes one embodiment of the content streaming module 104. Furthermore, the content streaming module 104 includes a pre-caching determination module 402, a content determination module 404, and a pre-caching module 406.

The pre-caching determination module 402 determines whether to perform pre-caching of streaming content. As may be appreciated, pre-caching may refer to downloading data ahead of time in anticipation of its use. Accordingly, pre-caching of streaming content may refer to downloading streaming content ahead of time in anticipation of its use. It should be noted that streaming content may refer to audio and/or video (e.g., an audio and/or video file) on a network (e.g., the Internet) that is partially downloaded and then played as the remainder of the audio and/or video is being downloaded. Therefore, the pre-caching determination module 402 may be used to anticipate (e.g., predict) that streaming content will be used before it is actually accessed or used.

In one embodiment, the pre-caching determination module 402 detects input from a sensor (e.g., sensor(s) 212 and 312) in order to determine to perform pre-caching of streaming content. The input from the sensor may be used to predict that new streaming content will be accessed or used before it is actually accessed or used. The input from the sensor may be any data, information, and/or feedback output from the sensor and received by the pre-caching determination module 402. In certain embodiments, the sensor may include one or more of an accelerometer, a gyroscope, a camera, a proximity sensor, a button, a touch-sensitive sensor, an audio sensor (e.g., microphone), and a motion sensor.

In certain embodiments, the sensor may be an accelerometer or a gyroscope that detects that a user has picked up the remote control 108 and/or changed the remote control 108 from a non-moving state to a moving state. In such embodiments, the accelerometer or gyroscope may be part of the remote control 108 and may transmit the detected sensor data to the information handling device 102 for use by the content streaming module 104. In one embodiment, the accelerometer or gyroscope may be used to determine a direction that the remote control 108 is pointed to predict whether the user is attempting to change a streaming content (e.g., channel).

In various embodiments, the sensor may be a camera that is part of the information handling device 102 and/or the remote control 108. The camera may be used to detect that a user is reaching for the remote control 108 to change the streaming content. In certain embodiments, the camera may be used to detect that the user is performing a motion command (e.g., gesture) used to change the streaming content. In one embodiment, the camera may be used to detect a direction that the user is pointing the remote control 108 to predict whether the user is attempting to change the streaming content. In another embodiment, the camera may be used to detect a gaze of the user (e.g., a direction that the user is looking, what the user is looking at) and/or whether the user is looking away from the information handling device 102. As may be appreciated, based on the gaze of the user and/or whether the user is looking away from the information handling device 102, the pre-caching determination module 402 may determine that a user is planning to change the streaming content. For example, the user may be looking away from the information handling device 102 (e.g., television) to find the remote control 108 in order to change the streaming content.

In some embodiments, the sensor may be an audio sensor that is part of the information handling device 102 and/or the remote control 108. In one embodiment, the audio sensor may be used to detect that the user is providing a voice command used to change the streaming content.

In various embodiments, the sensor may be a proximity sensor that is part of the information handling device 102 and/or the remote control 108. The proximity sensor, in certain embodiments, may detect that the user is about to pick up the remote control 108 (e.g., reaching for the remote control 108). In one embodiment, the proximity sensor may detect that the user's finger or hand is approaching a button to change the streaming content. Accordingly, the pre-caching determination module 402 may detect input from the sensor that indicates a predicted change to a currently streaming content (e.g., a streaming content presently being viewed by a user).

In some embodiments, the pre-caching determination module 402 may determine to perform pre-caching of streaming content by detecting that an end portion of a currently streaming content is reached. The end portion may include a portion of the currently streaming content that includes credits and/or approximately the last 1, 2, 3, 4, or 5 minutes of the currently streaming content, for example. In various embodiments, the pre-caching determination module 402 may determine to perform pre-caching of streaming content by learning a user's viewing habits (e.g., the user doesn't watch credits, the user watches credits, etc.) and using the user's viewing habits to determine when to perform pre-caching. In certain embodiments, a user may configure their viewing habits.

In one embodiment, the pre-caching determination module 402 may determine to perform pre-caching of streaming content based on a selection tool (e.g., remote control 108, mouse, keyboard, gesture, etc.) providing a selection input that hovers, rests, or stays on a selectable streaming content (e.g., channel) for a predetermined period of time. The predetermined period of time may be any suitable time, such as 1, 2, 3, 4, or 5 seconds, less than 1 second, or greater than 5 seconds, for example.

In some embodiments, the content determination module 404 may be used to determine a streaming content to pre-cache (e.g., to determine one or more streaming contents to pre-cache). In one embodiment, the content determination module 404 may determine the streaming content to pre-cache by predicting the streaming content based on a viewing history of one or more users. The viewing history may include favorite streaming content (e.g., programs and/or channels) that one or more users regularly view. In certain embodiments, the viewing history may include dates, times, and/or days of the week that correspond to specific streaming content viewed. In various embodiments, the viewing history may be learned by the content determination module 404, while in other embodiments users may configure their viewing preferences (e.g., favorite streaming content, dates, times, days of the week for various content, etc.).

In one embodiment, the content determination module 404 may determine the streaming content to pre-cache by predicting the streaming content based on a viewing pattern. The viewing pattern may be any suitable pattern, such as a date, time, and/or days of the week that streaming content is viewed, a pattern of switching back and forth between two or more different streaming contents (e.g., switching back and forth between two channels, switching between two football games, three plus channels being toggled, etc.), a pattern of surfing through streaming content (e.g., channel up, up, up; channel down, down, down, etc.), and so forth. In certain embodiments, the content determination module 404 may determine the streaming content to pre-cache by determining multiple streaming contents to pre-cache. For example, the content determination module 404 may predict that the user may select one of 2, 3, 4, 5, or more streaming contents as the next streaming content following the currently streaming content.

In one embodiment, the pre-caching module 406 may pre-cache the streaming content. In certain embodiments, the streaming content is pre-cached by the pre-caching module 406 for a predetermined period of time. In other words, a predetermined period of the streaming content may be pre-cached. For example, 100 milliseconds ("ms"), 200 ms, 500 ms, 1 second, 2 seconds, 3 seconds, or 5 seconds of the streaming content may be pre-cached. In some embodiments, less than 100 ms, or greater than 5 seconds of the streaming content may be pre-cached.

In some embodiments, the pre-caching module 406 may pre-cache the streaming content by pre-caching a smaller amount of data than available. For example, if multiple streaming contents are pre-cached, each streaming content may be pre-cached at a lower quality than available thereby resulting in less data stored for each streaming content. As another example, 1 second of data available for a streaming content may be 1 megabyte ("MB") and the streaming content may be pre-cached at a lower quality that is only 0.5 MB for 1 second. In some embodiments, the amount of data pre-cached may depend on a downloading speed available and/or an amount of storage available for pre-cached data.

Figure 5:
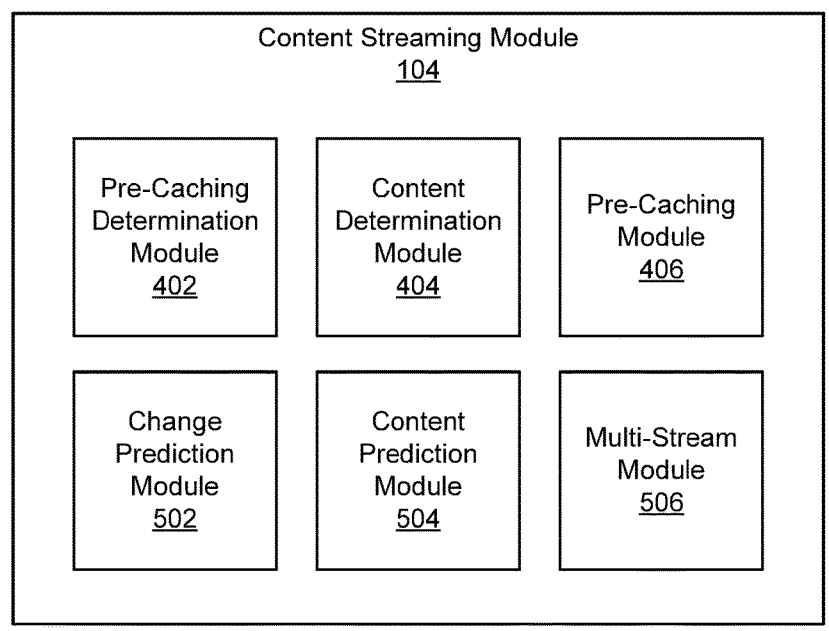
FIG. 5 is a schematic block diagram illustrating another embodiment of an apparatus including a content streaming module.

FIG. 5 is a schematic block diagram illustrating another embodiment of an apparatus 500 that includes one embodiment of the content streaming module 104. Furthermore, the content streaming module 104 includes one embodiment of the pre-caching determination module 402, the content determination module 404, and the pre-caching module 406, that may be substantially similar to the pre-caching determination module 402, the content determination module 404, and the pre-caching module 406 described in relation to FIG. 4. The content streaming module 104 also includes a change prediction module 502, a content prediction module 504, and a multi-stream module 506.

The change prediction module 502 be used to predict a time when pre-caching should begin and/or occur. The change prediction module 502 may use one or more sensors as described in relation to the pre-caching determination module 402 to receive information used to predict when pre-caching should occur. Such sensors may indicate that a user is about to change a streaming content by detecting that the user is reaching for the remote control 108, looking for the remote control 108, and/or changing the streaming content in any other way. Accordingly, the change prediction module 502 may analyze information from the one or more sensors and predict when to perform pre-caching. In certain embodiments, various inputs from the one or more sensors may be assigned a prediction score, and when the combined prediction score of the various inputs passes a predetermined threshold the change prediction module 502 may determine that pre-caching is to be performed.

In some embodiments, the content prediction module 504 may be used to predict one or more streaming contents to pre-cache. The prediction may be based on any of the methods used by the content determination module 404. For example, the content prediction module 504 may analyze a user's viewing history, viewing patterns, settings, configurations, and so forth to determine one or more streaming contents to pre-cache. In certain embodiments, the content prediction module 504 may rank the possible streaming contents and select up to the five (or more) highest ranked possible streaming contents to pre-cache. In another embodiment, the content prediction module 504 may assign a prediction score to possible streaming contents and select one or more streaming contents with the highest prediction score. In certain embodiments, one or more streaming contents are selected if the prediction score is greater than a predetermined threshold.

In one embodiment, the multi-stream module 506 may determine a length of time to pre-cache the one or more streaming contents. The length of time may be based on a number of the one or more streaming contents. In some embodiments, the length of time for each streaming content may vary. For example, a longer amount of time may be pre-cached for streaming content with a high predictive score than for streaming content with a low predictive score. Furthermore, in certain embodiments, the multi-stream module 506 may determine an amount of data (e.g., data quality) to pre-cache for each of the one or more streaming contents. The amount of data to pre-cache may be based on a number of the one or more streaming contents. In some embodiments, the amount of data pre-cached for each streaming content may vary. For example, a larger amount of data may be pre-cached for streaming content with a high predictive score than for streaming content with a low predictive score.

Figure 6:
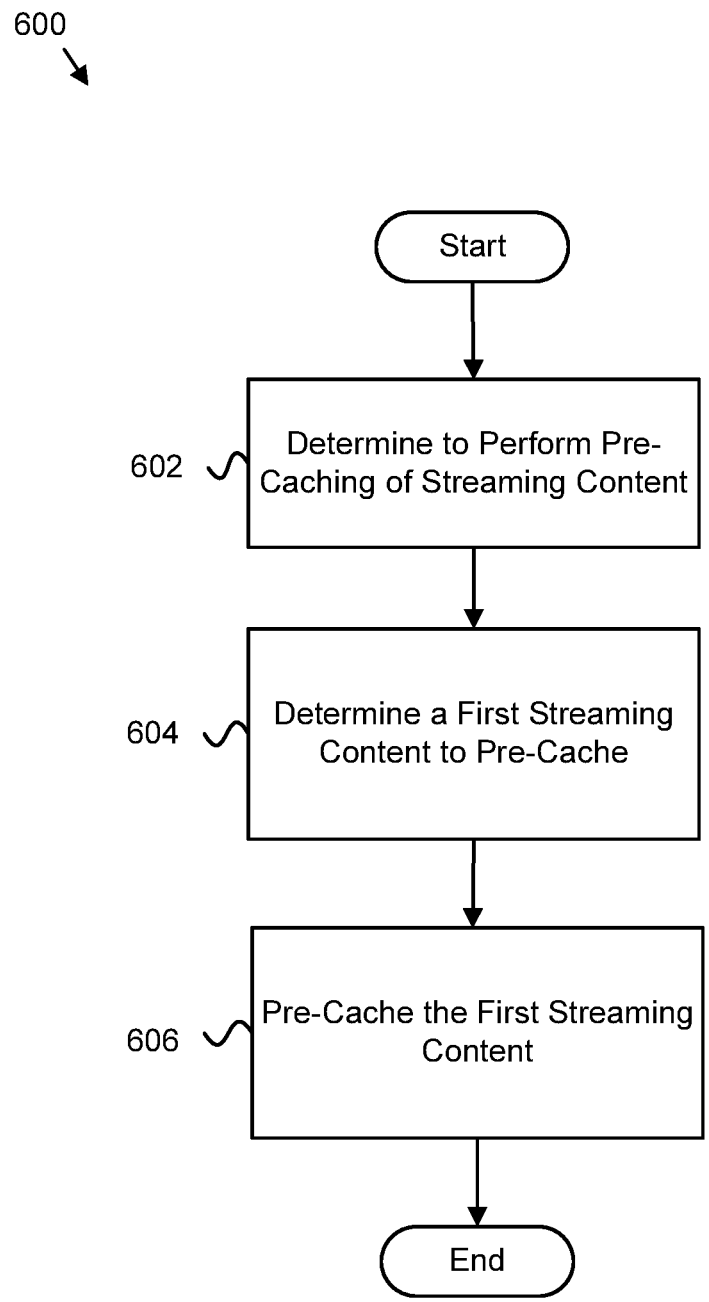
FIG. 6 is a schematic flow chart diagram illustrating an embodiment of a method for pre-caching streaming content.

FIG. 6 is a schematic flow chart diagram illustrating an embodiment of a method 600 for pre-caching streaming content. In some embodiments, the method 600 is performed by an apparatus, such as the information handling device 102. In other embodiments, the method 600 may be performed by a module, such as the content streaming module 104. In certain embodiments, the method 600 may be performed by a processor executing program code, for example, a microcontroller, a microprocessor, a CPU, a GPU, an auxiliary processing unit, a FPGA, or the like.

The method 600 may include determining 602 to perform pre-caching of streaming content. In certain embodiments, the pre-caching determination module 402 may determine 602 to perform pre-caching of streaming content. In some embodiments, determining 602 to perform pre-caching of streaming content may include detecting input from a sensor. In such embodiments, detecting input from the sensor may include detecting input from a device selected from a group that includes an accelerometer, a gyroscope, a camera, a proximity sensor, a button, a touch-sensitive sensor, an audio sensor, and a motion sensor. In certain embodiments, detecting input from the sensor includes detecting input indicating a predicted change to a currently streaming content. In various embodiments, determining 602 to perform pre-caching of streaming content includes detecting that an end portion of a currently streaming content is reached.

The method 600 may also include determining 604 a streaming content to pre-cache. In certain embodiments, the content determination module 404 may determine 604 the streaming content to pre-cache. In one embodiment, determining 604 the streaming content to pre-cache includes predicting the streaming content based on a viewing history. In some embodiments, determining 604 the streaming content to pre-cache includes predicting the streaming content based on a viewing pattern. In various embodiments, determining 604 the streaming content to pre-cache includes determining multiple streaming contents to pre-cache.

The method 600 may pre-cache 606 the streaming content, and the method 600 may end. In one embodiment, the pre-caching module 406 may pre-cache 606 the streaming content. In certain embodiments, pre-caching 606 the streaming content includes pre-caching a predetermined period of time of the streaming content. In some embodiments, pre-caching 606 the streaming content includes pre-caching a smaller amount of data than available. In various embodiments, pre-caching 606 the streaming content includes pre-caching each streaming content of multiple streaming contents.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
     detect that a predetermined time period of a currently streaming video remains to be viewed by: detecting an end portion of the currently streaming video, detecting credits, detecting a last number of minutes of the currently streaming content, learning a user's viewing habits, detecting an input from a selection tool, or some combination thereof;

predict a plurality of streaming videos anticipated to be viewed after the currently streaming video based on a user's viewing pattern, a viewing history, or a combination thereof, wherein the user's viewing pattern comprises a pattern of switching back and forth between two or more different streaming contents, a pattern of surfing through streaming content, or a combination thereof;

determine to perform pre-caching of the plurality of streaming videos in response to detecting that the predetermined time period of the currently streaming video remains to be viewed;

rank the plurality of streaming videos;

pre-cache the plurality of streaming videos based on the ranking while the currently streaming video is being viewed; and display at least one streaming video of the plurality of streaming videos predicted to be a next streaming video following the currently streaming video.

2. The apparatus of claim 1, wherein the code executable by the processor to determine to perform pre-caching of the plurality of streaming videos further comprises code executable by the processor to detect input from a sensor.

3. The apparatus of claim 2, wherein the code executable by the processor to determine to detect input from the sensor further comprises code executable by the processor to detect input indicating a predicted change to the currently streaming video.

4. The apparatus of claim 1, wherein the code executable by the processor to pre-cache the plurality of streaming videos further comprises code executable by the processor to pre-cache a predetermined period of time of the plurality of streaming videos.

5. The apparatus of claim 1, wherein the code executable by the processor to pre-cache the plurality of streaming videos further comprises code executable by the processor to pre-cache a smaller amount of data than available.

6. A method comprising:

detecting that a predetermined time period of a currently streaming video remains to be viewed by: detecting an end portion of the currently streaming video, detecting credits, detecting a last number of minutes of the currently streaming content, learning a user's viewing habits, detecting an input from a selection tool, or some combination thereof;

predicting a plurality of streaming videos anticipated to be viewed after the currently streaming video based on a user's viewing pattern, a viewing history, or a combination thereof, wherein the user's viewing pattern comprises a pattern of switching back and forth between two or more different streaming contents, a pattern of surfing through streaming content, or a combination thereof;

determining, by use of a processor, to perform pre-caching of the plurality of streaming videos in response to detecting that the predetermined time period of the currently streaming video remains to be viewed;

ranking the plurality of streaming videos;

pre-caching the plurality of streaming videos based on the ranking while the currently streaming video is being viewed; and displaying at least one streaming video of the plurality of streaming videos predicted to be a next streaming video following the currently streaming video.

7. The method of claim 6, wherein determining to perform pre-caching of the plurality of streaming videos comprises detecting input from a sensor.

8. The method of claim 7, wherein detecting input from the sensor comprises detecting input from a device selected from the group consisting of an accelerometer, a gyroscope, a camera, a proximity sensor, a button, a touch-sensitive sensor, an audio sensor, and a motion sensor.

9. The method of claim 7, wherein detecting input from the sensor comprises detecting input indicating a predicted change to the currently streaming video.

10. The method of claim 6, wherein pre-caching the plurality of streaming videos while the currently streaming video is being viewed comprises pre-caching a predetermined period of time of the plurality of streaming videos.

11. The method of claim 6, wherein pre-caching the plurality of streaming videos comprises pre-caching a smaller amount of data than available.

12. A program product comprising a non-transitory computer readable storage medium that stores code executable by a processor, the executable code comprising code to perform:

detecting that a predetermined time period of a currently streaming video remains to be viewed by: detecting an end portion of the currently streaming video, detecting credits, detecting a last number of minutes of the currently streaming content, learning a user's viewing habits, detecting an input from a selection tool, or some combination thereof;

predicting a plurality of streaming videos anticipated to be viewed after the currently streaming video based on a user's viewing pattern, a viewing history, or a combination thereof, wherein the user's viewing pattern comprises a pattern of switching back and forth between two or more different streaming contents, a pattern of surfing through streaming content, or a combination thereof;

determining to perform pre-caching of the plurality of streaming videos in response to detecting that the predetermined time period of the currently streaming video remains to be viewed;

ranking the plurality of streaming videos;

pre-caching the plurality of streaming videos based on the ranking while the currently streaming video is being viewed; and displaying at least one streaming video of the plurality of streaming videos predicted to be a next streaming video following the currently streaming video.

* * * * *